(12) United States Patent
Kwak et al.

(10) Patent No.: US 8,462,740 B2
(45) Date of Patent: Jun. 11, 2013

(54) METHOD FOR GENERATING CONTROL CHANNEL AND DECODING CONTROL CHANNEL, BASE STATION AND MOBILE STATION THEREOF

(75) Inventors: Jin Sam Kwak, Anyang-si (KR); Yeong Hyeon Kwon, Anyang-si (KR); Seung Hee Han, Anyang-si (KR); Hyun Woo Lee, Anyang-si (KR); Dong Cheol Kim, Anyang-si (KR); Min Seok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 421 days.

(21) Appl. No.: 12/681,374

(22) PCT Filed: Oct. 1, 2008

(86) PCT No.: PCT/KR2008/005780
§ 371 (c)(1),
(2), (4) Date: Apr. 1, 2010

(87) PCT Pub. No.: WO2009/051359
PCT Pub. Date: Apr. 23, 2009

(65) Prior Publication Data
US 2010/0208710 A1    Aug. 19, 2010

(30) Foreign Application Priority Data
Oct. 19, 2007 (KR) .................. 10-2007-0105570

(51) Int. Cl.
*H04J 3/00* (2006.01)
(52) U.S. Cl.
USPC ........... 370/336; 370/464; 370/474; 370/475; 370/476

(58) Field of Classification Search
None
See application file for complete search history.

(56) References Cited

U.S. PATENT DOCUMENTS

| | | | |
|---|---|---|---|
| 2005/0259623 A1* | 11/2005 | Garudadri et al. | 370/335 |
| 2006/0035654 A1* | 2/2006 | Lee et al. | 455/502 |
| 2006/0209734 A1* | 9/2006 | Son et al. | 370/312 |
| 2007/0110108 A1* | 5/2007 | Kang et al. | 370/515 |
| 2008/0039107 A1* | 2/2008 | Ma et al. | 455/450 |
| 2008/0285513 A1* | 11/2008 | Jung et al. | 370/329 |
| 2009/0016375 A1* | 1/2009 | Hsieh et al. | 370/465 |

FOREIGN PATENT DOCUMENTS

| | | |
|---|---|---|
| EP | 1763275 A1 | 3/2007 |
| EP | 1826972 A2 | 8/2007 |
| KR | 10-0765818 B1 | 10/2007 |

* cited by examiner

*Primary Examiner* — Charles C Jiang
(74) *Attorney, Agent, or Firm* — McKenna Long & Aldridge LLP (57) ABSTRACT

A control channel generation method, a control channel decoding method, and a BS and an MS for implementing the methods are provided. The control channel generation method includes placing a frame control header (FCH) and a MAP within a TTI and generating a control channel for an enhanced communication system at a position after the MAP within the TTI. Another control channel generation method includes generating a control channel for the enhanced communication system and placing an FCH and a preamble at a position after the control channel. These methods enable implementation of an enhanced system that overcomes problems of the legacy system while minimizing influence exerted upon legacy MSs in the case where the base station generates a new control channel for a new MS or where an MS decodes a new control channel.

12 Claims, 4 Drawing Sheets

FIG. 4

METHOD FOR GENERATING CONTROL CHANNEL AND DECODING CONTROL CHANNEL, BASE STATION AND MOBILE STATION THEREOF This application is a National Stage Entry of International Application No. PCT/KR2008/005780, filed on Oct. 1, 2008, and claims priority to Korean Patent Application No. 10-2007-0105570, filed Oct. 19, 2007, each of which are hereby incorporated by reference in their entireties as if fully set forth herein.

TECHNICAL FIELD

The present invention relates to a new channel structure for information transmission in a legacy communication system structure or a modified system structure, and more particularly, to a method and apparatus for generating new control channels without affecting the legacy structure or the modified structure to allow new terminals or Mobile Stations (MSs) to easily identify and access an enhanced system.

BACKGROUND ART

For next-generation mobile communication, there is a need to provide high-speed high-quality data transmission to support a variety of multimedia services with higher quality. Recently, intensive studies have been carried out on Orthogonal Frequency Division Multiplexing Access (OFDMA) and Single Carrier Frequency Division Multiple Access (SC-FDMA) as methods to meet such a need.

The Orthogonal Frequency Division Multiplexing (OFDM) method that is a basis of the OFDMA method has been widely considered as a physical layer transport method for a variety of wireless communication systems such as wireless LANs, digital TVs, and next-generation mobile communication systems since the OFDM method has an advantage in that it enables high-speed communication with low equalization complexity in frequency selective fading channels.

Control channels in a communication system are common channels through which transmitting and receiving sides can exchange the same information with each other. The control channels are configured to suit a basic protocol structure in which the system operates.

Although the present invention is not limited to the IEEE 801.16 system, the following description will be given with reference to the IEEE 801.16 frame structure as an example for ease of explanation.

Figure 1:
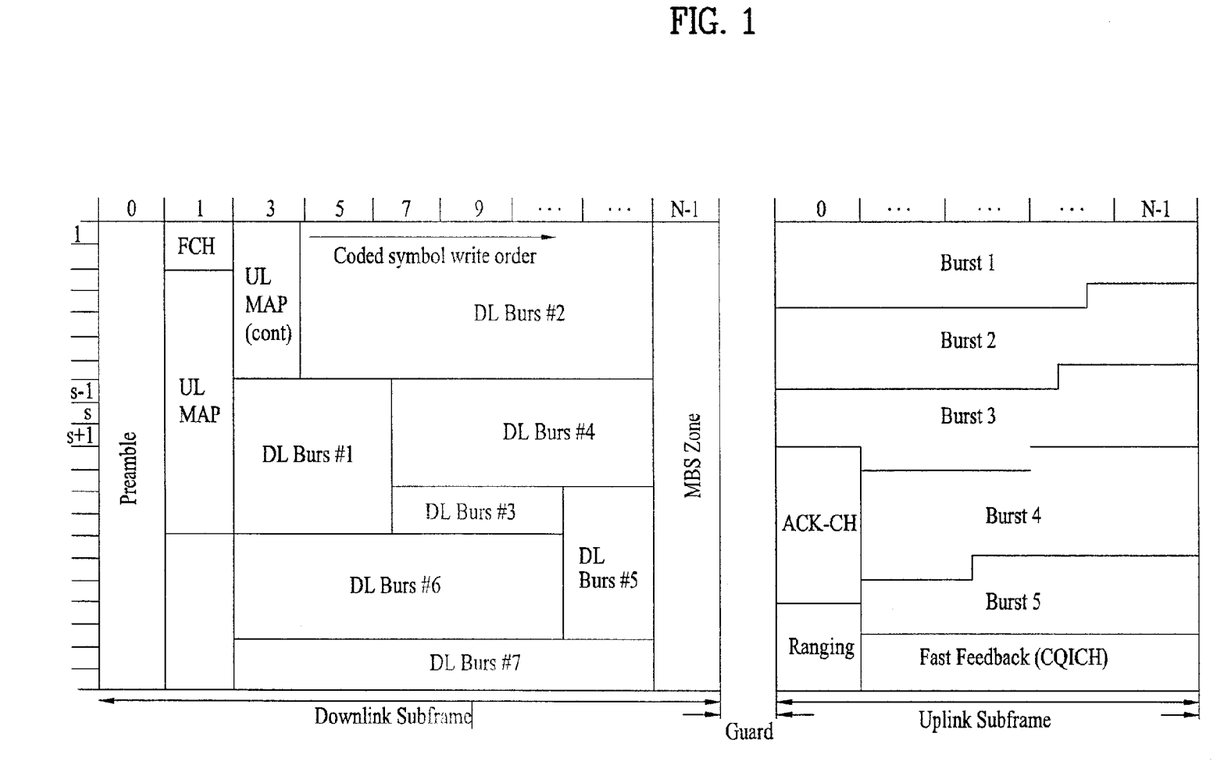
FIG. 1 illustrates a TDD frame structure of the IEEE 801.16 communication system.

FIG. 1 illustrates a Time Division Duplex (TDD) frame structure of the IEEE 801.16 communication system.

Every transmission frame has a specific length and may include a preamble indicating the start of the frame, a MAP containing information of use of the frame, located subsequent to the preamble, a Frame Control Header (FCH) indicating configuration information of the MAP, a data burst section which can be used for general purposes, an uplink data section, and an uplink-related control channel. Here, the data burst section may include a variety of zones and the uplink data section may also include zones.

A radio frame illustrated in FIG. 1 includes a downlink subframe and an uplink subframe. The downlink frame starts with a preamble for synchronization and downlink transmission and includes a control information field and a data field. The control information field includes control information such as an uplink MAP (UL-MAP) message and a Downlink MAP (DL-MAP) message for providing resource allocation information of each user terminal (or mobile station).

The DL-MAP message of the downlink frame includes DL-MAP IEs of each user terminal and shared information such as a base station ID, a Downlink Channel Descriptor (DCD) count, a physical layer (PHY) synchronization field, and a management message type. Each DL-MAP IE includes OFDMA symbols and subchannels for each PHY burst of a data area and associated Downlink Interval Usage Codes (DIUCs) and defines downlink transmission using these components.

The UL-MAP message included in the uplink frame includes UL-MAP IEs of each user terminal and shared information such as an allocation start time, an uplink Channel Descriptor (UCD) count, an uplink channel ID, and a management message type. Each UL-MAP IE includes a Connection Identifier (CID) and associated Uplink Interval Usage Codes (UIUCs) and defines uplink transmission using these components.

Accordingly, each terminal which operate in the system searches for such control channels and receives various cell information that enables use of this or subsequent frame. The channel or frame structure should not be changed to successfully perform these processes.

However, when the actual system evolves as in IEEE 802.16m, the system has new features and the legacy control channel structure needs to be changed to reflect the new features. Therefore, there is a need to generate a compatible channel structure. For this need, it is not possible to completely overcome problems of the legacy system.

To meet various system requirements, legacy structures are maintained for compatibility even when a time varying system is enhanced due to the cell size, the terminal travel speed, or the like and thus new terminals of the enhanced system have the same problems as those of the legacy system.

That is, a method of improving performance and efficiency of use of legacy channels is generally used to enhance the legacy system. However, the enhanced system is implemented with the same problems as those of the legacy system.

DISCLOSURE

Technical Problem

A first object of the present invention devised to solve the problem lies on providing a control channel generation method which enables implementation of an enhanced system that overcomes the problems of the legacy system while minimizing influence exerted upon legacy mobile stations.

A second object of the present invention devised to solve the problem lies on providing a control channel decoding method that enables a newly designed mobile station to operate through a control channel generated according to the control channel generation method.

A third object of the present invention devised to solve the problem lies on providing a base station for implementing the control channel generation method in a communication system.

A fourth object of the present invention devised to solve the problem lies on providing a mobile station for implementing the control channel decoding method in a communication system.

Technical Solution

In accordance with an embodiment of the present invention to achieve the first object, provided herein is a method for additionally generating a control channel for an enhanced communication system, the method including placing a frame control header (FCH) and a MAP within a transmission time interval, and generating the control channel for the enhanced communication system at a position after the MAP within the transmission time interval.

The step of placing the FCH and the MAP may include inserting size information of the MAP and information indicating whether or not the control channel is present into the FCH.

The step of placing the FCH and the MAP may include inserting additional information, which notifies the MS of a format of the control channel for the enhanced communication system or of whether or not the new control channel is present, at a start position of the control channel.

The step of generating the control channel may include generating a plurality of control channels including one or more types of control channels.

In accordance with another embodiment of the present invention to achieve the first object, provided herein is a method for additionally generating a control channel for an enhanced communication system, the method including generating a control channel for the enhanced communication system, and placing a frame control header (FCH) and a preamble at a position after the control channel.

The step of generating the control channel may include placing at least one of an additional preamble or an additional FCH, wherein the additional preamble includes information regarding a start position of the control channel and the additional FCH includes a size of the control channel, and generating a control channel at a predetermined start position.

In accordance with an embodiment of the present invention to achieve the second object, provided herein is a method for decoding a control channel additionally generated for an enhanced communication system, the method including reading a size of a MAP and information indicating whether or not the control channel is present from a frame control header (FCH), and decoding the control channel after identifying a start position of the control channel taking into consideration the size of the MAP if the control channel is present.

The step of decoding the control channel may include selectively decoding the control channel placed after a position of the MAP after reading a type of the control channel from the FCH.

The step of decoding the control channel may include decoding the MAP by an MS if the MS does not support the enhanced communication system.

The step of decoding the control channel may include detecting a format of the control channel by performing blind detection.

In accordance with another embodiment of the present invention to achieve the second object, provided herein is a method for decoding a control channel additionally generated for an enhanced communication system, the method including identifying an additional control channel in a backward direction in a time domain, starting from a position of a preamble, while a mobile station (MS) buffers downlink signals, and decoding the additional control channel.

The step of identifying the additional control channel may include reading an additional preamble and an additional frame control header (FCH), wherein the additional preamble includes information regarding a start position of the control channel and the additional FCH includes information regarding a size of the control channel.

In accordance with an embodiment of the present invention to achieve the third object, provided herein is a Base Station (BS) including a transmitter for transmitting downlink signals to an MS, wherein the transmitter is set to place a frame control header and a MAP within a transmit time interval and to generate a control channel for an enhanced communication system at a position subsequent to the MAP within the TTI.

In accordance with another embodiment of the present invention to achieve the third object, provided herein is a BS including a transmitter for transmitting downlink signals to an MS, wherein the transmitter is set to first generate a control channel for an enhanced communication system and to place a preamble and a frame control header for a legacy communication system at positions subsequent to the control channel.

In accordance with an embodiment of the present invention to achieve the fourth object, provided herein is an MS including firmware for a protocol of an enhanced communication system, wherein the firmware is set to read MAP size information and information indicating whether or not a newly generated control channel is present from a frame control header of a downlink signal received from a BS and to identify, when a newly generated control channel is present, a start position of the newly generated control channel taking into consideration the size of a legacy MAP to decode the control channel.

In accordance with another embodiment of the present invention to achieve the fourth object, provided herein is an MS including firmware for a protocol of an enhanced communication system, wherein the firmware is set to identify the additionally generated control channel in a backward direction of the time domain, starting from a position of the preamble, while the MS buffers a downlink signal received from the BS and to decode the identified control channel.

ADVANTAGEOUS EFFECTS

According to the embodiments of the present invention, it is possible to implement an enhanced system that overcomes the problems of the legacy system while minimizing influence exerted upon legacy MSs in the case where the base station generates a new control channel for a new MS or in the case where an MS decodes a new control channel.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The embodiments of the present invention suggest a method for additionally generating a control channel that a new Mobile Station (MS) can identify without causing inter-cell interference or interference with a legacy MS, a method for decoding the control channel, and relevant devices.

In the following description, exemplary embodiments of the present invention will be described with reference to the drawings. However, the embodiments of the present invention can be changed to various other forms and the scope of the invention is not limited to the embodiments described below.

A legacy MS may identify a downlink control channel and a newly designed MS may identify a downlink signal. So as not to have any influence upon legacy MSs in this situation, it is necessary that scheduling and frames of a base station supporting legacy MSs be designed so as to minimize the amount or number of control signals that are changed for operating regions of the legacy MSs.

If a legacy control channel is present, reuse of the legacy control channel without change is advantageous when the legacy MS operates in a newly designed system. However, since the enhanced system entails the problems of the legacy system in the case where the control signal structure has not been optimized as in the IEEE 802.16 system, operating the newly designed MS through a newly designed channel in the system is advantageous for more efficient utilization of frequency resources.

Accordingly, the embodiments suggest the following methods for generating a new channel.

First, reference is made to an example wherein an additional control channel is generated subsequent to a MAP burst.

Figure 2:
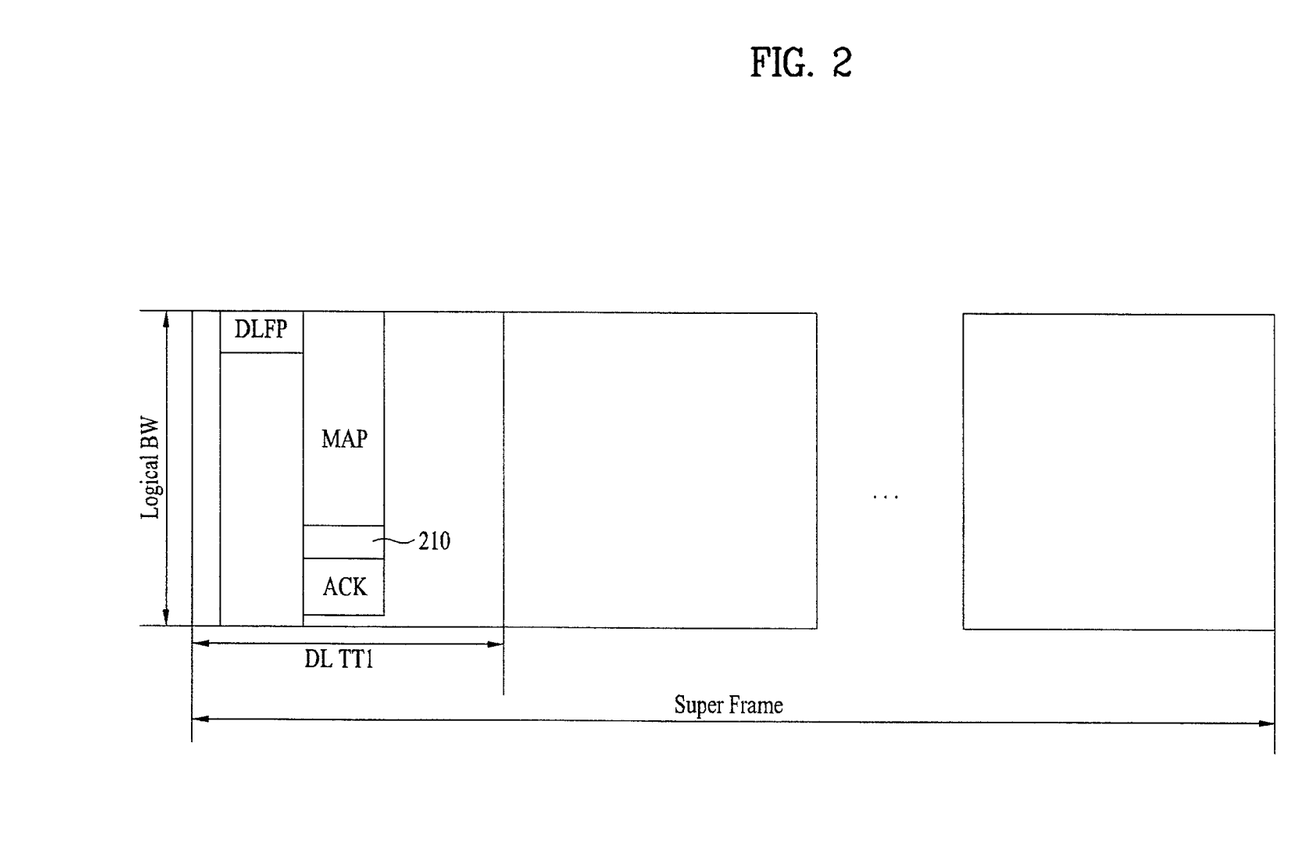
FIG. 2 illustrates an example of a method for generating a control channel according to an embodiment of the present invention.

FIG. 2 illustrates an example of a method for generating a control channel according to an embodiment of the present invention.

Specifically, FIG. 2 illustrates an example wherein a new downlink control channel is generated at a position subsequent to a MAP burst. The channel arrangement of FIG. 2 is only illustrative and the present invention is not limited thereto.

In this method, if there is another control channel used by the legacy MS, the new channel is placed subsequent to the control channel or the new channel is generated subsequent to the section of a control signal channel, the size of which is known to the legacy MS.

As shown in FIG. 2, a legacy frame control header and a legacy MAP are placed within a downlink Transmit Time Interval (DL TTI) and the new control channel 210 is then generated as a control channel for an enhanced communication system at a position subsequent to the legacy MAP within the DL TTI. Here, the position subsequent to the MAP may be immediately adjacent to the MAP or predetermined according to specifications or the like.

The channel 210 generated subsequent to the MAP may be any control channel. Especially, the new MS does not need to identify the legacy MAP. In the case where the MS is capable of identifying the new control channel 210, the MS can immediately identify the new control channel by reading MAP size information from a Downlink Frame Prefix (DLFP), i.e., from the FCH, and then skipping a region corresponding to the MAP size. In the following description, the DLFP may have the same meaning as the FCH.

The legacy MS first reads the DLFP to obtain MAP format information as usual and then decodes the MAP. The legacy MS cannot identify the new control channel since information of allocation of each terminal is directly indicated in the MAP.

Accordingly, the new MS can operate through the new control channel while the legacy MS is not affected by the operation of the newly designed system at all.

Here, a method for indicating, in the DLFP control channel, whether or not a new system is present may be needed. For example, since the new terminal needs to determine whether or not a newly designed control channel is present subsequent to the MAP before skipping the MAP, whether or not the new control channel is present may be indicated simply by one or more bits in the DLFP.

That is, in order to decode the additionally generated control channel, the MS reads information indicating whether or not an additionally generated control channel is present and MAP size information from the frame control header and can determine the start position of the control channel based on the MAP size when an additionally generated control channel is present.

Accordingly, the new MS can immediately detect the new control channel based on the legacy MAP size and the additional information of the DLFP. The additional information of the new control channel may not be needed in the case where the legacy DLFP channel can provide sufficient information of the new system.

On the other hand, when the number of actually remaining reserved bits (i.e., the number of bits that can be used without changing the structure of the legacy control channel) is not sufficient, additional information elements that can aid the DLFP can be placed at the start position of the new control channel. Here, the additional information elements may be a channel similar to the DLFP which indicates the size, format, or the like of the new control channel placed subsequently the additional information elements.

The type of a control channel present subsequent to the MAP can be selectively indicated in the DLFP. For example, one or more control channels may be present together subsequent to the MAP. Specifically, control channels such as a new DLFP, a new MAP, an ACK/NACK feedback channel, a power control signaling channel, and a broadcast channel may be generated subsequent to the MAP. A number of such control channels may be present simultaneously. For example, the additionally generated control channels may be the same repeated channels or may be various types of mixed channels.

Accordingly, if the number of control channels, the size of each control channel, the type of each control channel, and the like can be indicated in the DLFP, an MS newly designed for the enhanced system can easily detect the new control channels. Particularly, the new MS can read the type of a newly added control channel from the FCH and selectively decode control channels present at positions subsequent to the MAP.

If sufficient control channel information cannot be carried in the DLFP, new control channels may have predetermined sizes or may be generated according to a variety of possible control channel formats. In this case, the MS may perform blind detection or may acquire new control channel information through a new control channel header.

FIGS. 3A to 3E illustrate example control channels that are added in the method of FIG. 2.

"MAPP+" and "FCHH+" in FIGS. 3A to 3E denote newly generated control channels which are different from the MAP and the DLFP of FIG. 2, respectively.

Figure 3A:
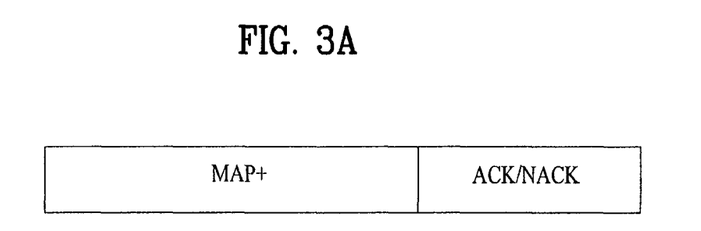
FIGS. 3A to 3E illustrate example control channels that are added in the method of FIG. 2.
Figure 3B:
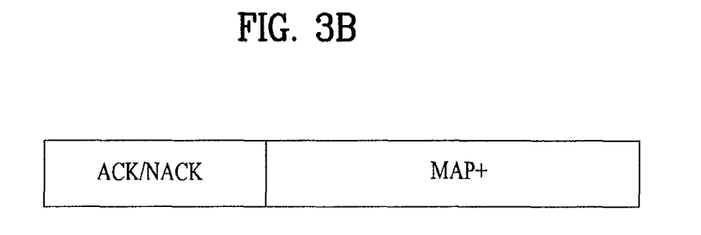
Figure 3C:
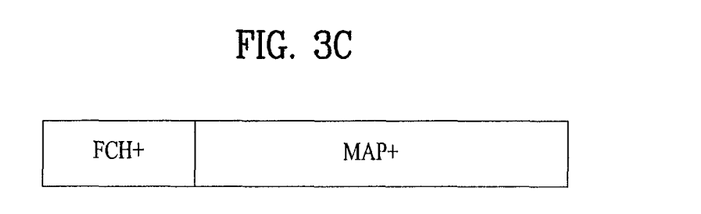
Figure 3D:
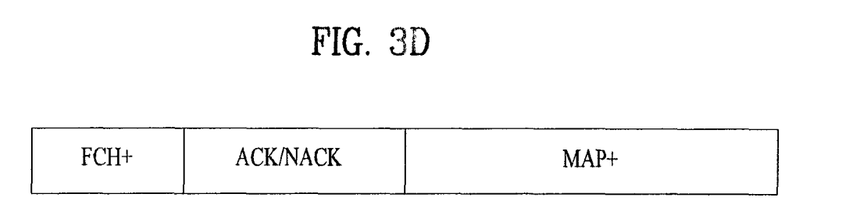
Figure 3E:
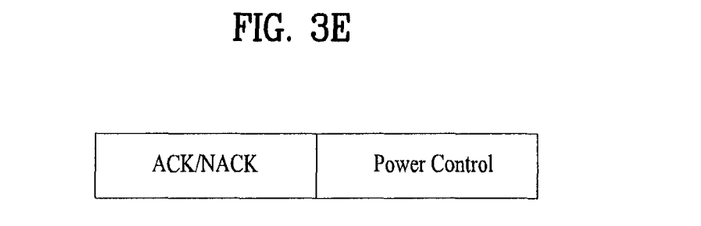

Specifically, FIGS. 3A and 3B illustrate examples wherein a MAP and an ACK/NACK channel are generated in different orders. FIGS. 3C and 3D illustrate examples wherein an FCH is generated as new control channel information and a MAP and other control channels are generated in different orders. FIG. 3E illustrates an example wherein only direct control channels are generated without the MAP.

Only one new control channel may be generated or a variety of new control channels may be generated and mixed. However, in the case where the FCH does not provide control channel size information, it may be necessary to correct the FCH since the legacy MAP needs to provide the control channel size information. In the case where the FCH is not corrected, a predetermined control channel format is detected through blind detection.

Although a new control channel may be generated and constructed according to the position of the legacy control channel as shown in FIGS. 3A to 3E, the position of the new control channel may be set optionally. Specifically, the position of the new control channel may be determined based on information received through a broadcast channel or specifications or information received through the DLFP or the like.

Although all control channel characteristics have been adjusted at the legacy MAP, frequency bands can actually be more efficiently used if the legacy MAP is wholly responsible for signaling a specific control signal. Especially, there is no need to use the MAP to transmit a control channel such as an ACK/NACK or power control channel which needs to transmit only a small number of bits. In this case, one method to reduce unnecessary overhead is to transmit the control channel using signaling resources (for example, time, frequency, code, etc.) assigned to the MS as shown in FIG. 3E.

That is, control channels including at least one of a control channel (for example, an ACK/NACK channel or a power control channel) that can transmit a small amount of information regardless of the MAP or a control channel (for example, DLFP, MAP, or channel information) that transmits a large amount of information in association with the MAP may be generated in the new control channel generation procedure.

Reference will now be made to the case where an additional control channel is generated prior to an FCH burst.

Figure 4:
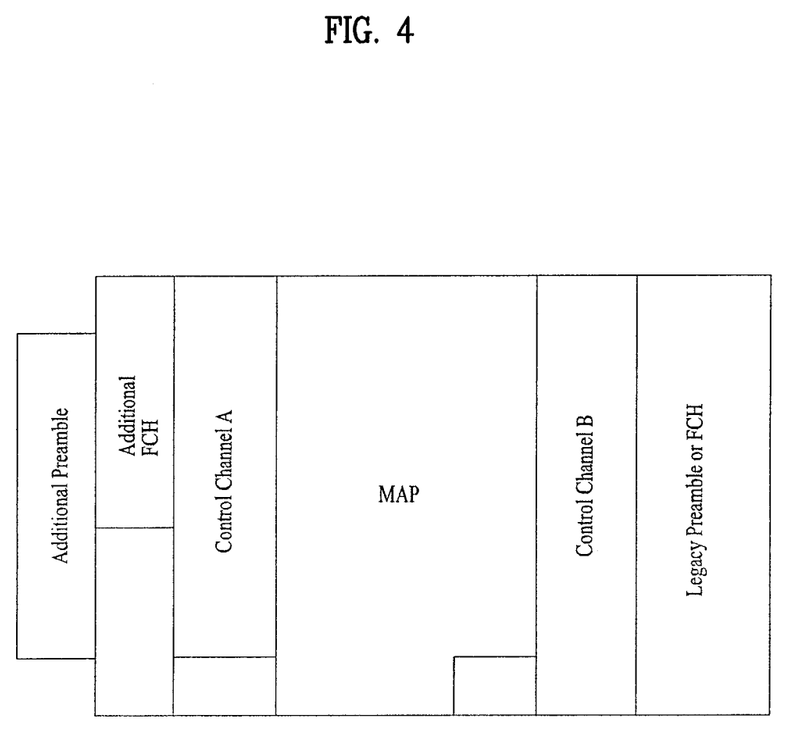
FIG. 4 illustrates an example method for generating a control channel according to another embodiment of the present invention.

FIG. 4 illustrates an example method for generating a control channel according to another embodiment of the present invention.

Unlike the example of FIG. 2, a new control channel may be placed prior to an FCH or preamble rather than subsequent to the legacy control channel. In this case, to detect a new control channel, the MS needs to perform buffering and it is desirable that information such as the FCH be placed immediately prior to the preamble.

In the example of FIG. 4, new control channels, i.e., an FCH, a control channel A, a MAP, and a control channel B are first generated and a legacy frame control header and a legacy preamble are placed at positions subsequent to the generated control channels. The new control channels illustrated in FIG. 4 are only an example for explaining another embodiment of the present invention and the present invention is not limited thereto. Here, a preamble used by the legacy MS may be used as a common preamble or a newly added preamble may be used.

In this case, an additional preamble for the new control channels may include information of the start position of each control channel and an additional Frame Control Header (FCH) may include information of the size of each control channel. When the additional preamble is not defined, each new control channel may be generated at a predetermined position subsequent to the additional FCH.

Accordingly, legacy MSs decode control channels according to a predetermined downlink signal detection method and new MSs buffer downlink signals and decode control channels in reverse order, starting from the position of the legacy preamble, for example, in a backward direction of the time domain. To accomplish this, the additional FCH may be located prior to the legacy preamble.

Alternatively, in the case where a new preamble different from the legacy preamble is defined, the new MS can detect the newly defined preamble to decode the FCH and the MAP or other control channels. In the case where the new preamble is applied, new control channels can be used even when the new control channels are generated at any positions different from the position of the legacy control channel. Especially, when a new zone is defined, new control channels may be located near the new zone or may be included in the new zone.

As in the case of FIG. 4, when a new preamble is generated, the total amount of frequency regions utilized by the new preamble can be reduced. That is, it is possible to specify a minimum preamble so as to cause only overhead required to enable the MS to identify the start of the control channel. The subsequent new control channels may be constructed in any combination. Here, the new FCH may indicate the structure of the new control channels or may indicate the total size of the control channels or the size of each individual control channel.

According to the embodiments of the present invention, relevant equipment may be set such that the control channel generation method is performed at the BS and the control channel decoding method is performed at the MS.

To accomplish this, a transmitter for transmitting downlink signals to the MS or a control logic of the transmitter should be changed in the BS. Specifically, a BS according to an embodiment of the present invention includes a transmitter that is set to place a frame control header and a MAP within a transmit time interval and to generate a control channel for an enhanced communication system at a position subsequent to the MAP within the TTI. In addition, a BS according to another embodiment of the present invention includes a transmitter that is set to first generate a control channel for an enhanced communication system and to place a preamble and a frame control header for a legacy communication system at positions subsequent to the control channel.

On the other hand, an MS newly designed for the enhanced communication system needs to be able to decode newly added control channels. To accomplish this, the configuration of a protocol-related logic (for example, firmware) embedded in the MS needs to be changed. Specifically, an MS according to an embodiment of the present invention includes firmware that is set to read MAP size information and information indicating whether or not a newly generated control channel is present from a frame control header of a downlink signal received from a BS and to identify, when a newly generated control channel is present, a start position of the newly generated control channel taking into consideration the size of a legacy MAP to decode the control channel. In addition, an MS according to another embodiment of the present invention includes firmware that is set to identify the additionally generated control channel in a backward direction of the time domain, starting from a position of the preamble, while the MS buffers a downlink signal received from the BS and to decode the identified control channel.

Whether or not the new MS needs to read the legacy MAP can be determined in addition to the generation of evolved control channels for the enhanced communication system. Since the legacy MAP includes a variety of information used by the legacy MS, it is wasteful to additionally provide the same information for the new MS. Accordingly, even if the new MS extracts operation information from the MAP, information indicating whether or the legacy MAP should be read may be included in a frame control header channel such as a DLFP in order to reduce overall control overhead or to achieve various other objects. Of course, even if such information is not included, no problem occurs when the new MS operates with the enhanced performance. However, overall overhead will be reduced if a variety of broadcast information for the legacy MS can be reused. Accordingly, such legacy control channel decoding information can be transmitted to the new MS not only through the legacy DLFP but also through a new broadcast channel or a newly generated control channel.

Although the present invention has been described with reference to the embodiments illustrated in the drawings, the embodiments are only illustrative and it will be apparent to those skilled in the art that various modifications and variations can be made from the embodiments. Such modifications and variations should be construed as being included in the scope of the invention. Thus, the scope of the invention should be determined based on the spirit of the appended claims.

Industrial Applicability

The present invention relates to a new channel structure for information transfer, and more particularly, to a method and apparatus for generating new control channels without affecting a legacy structure or a modified structure to allow new MSs to easily identify and access an enhanced system, and thus can be applied to a base station, a terminal, or other relevant equipment of an evolvable communication system.

The invention claimed is:

1. A method for additionally generating a control channel for an enhanced communication system where a frame control header (FCH) and a MAP are placed within a transmission time interval, the method comprising:
   generating an additional control channel for the enhanced communication system at a position after the MAP within the transmission time interval; and
   inserting decoding information regarding a legacy control channel into at least one of the FCH, the additional control channel and a broadcast channel, wherein the decoding information indicates whether or not an MS supporting the enhanced communication system needs to decode the legacy control channel,
   wherein the method further comprises:
   generating at least one of an additional preamble or an additional FCH, wherein the additional preamble includes information regarding a start position of the additional control channel and the additional FCH includes a size of the additional control channel; and
   generating a new control channel at a position determined according to the additional preamble or at a predetermined position after the additional FCH.

2. The method of claim 1, wherein the FCH comprises size information of the MAP and information indicating whether or not the additional control channel is present.

3. The method of claim 1, further comprising generating additional information that notifies the MS of a format of the control channel for the enhanced communication system at a start position of the control channel.

4. The method of claim 1, wherein the step of generating additional control channel comprises generating a plurality of control channels including one or more types of control channels.

5. The method of claim 1, wherein the step of generating additional control channel comprises generating a control channel including at least one of a control channel for transmitting a small amount of information and a control channel for transmitting a large amount of information.

6. A method for additionally generating a control channel for an enhanced communication system where a frame control header (FCH) and a preamble are placed within a transmission time interval, the method comprising:
   generating an additional control channel for the enhanced communication system at a position prior to the FCH and the preamble within the transmission time interval;
   inserting decoding information regarding a legacy control channel into at least one of the FCH, the additional control channel and a broadcast channel, broadcast channel or the additional control channel, wherein the decoding information indicates whether or not an MS supporting the enhanced communication system needs to decode the legacy control channel,
   wherein the method further comprises:
   generating at least one of an additional preamble or an additional FCH, wherein the additional preamble includes information regarding a start position of the additional control channel and the additional FCH includes a size of the additional control channel; and
   generating a new control channel at a position determined according to the additional preamble or at a predetermined position after the additional FCH.

7. A method for decoding an additional control channel generated for an enhanced communication system, the method comprising:
   reading a size of a MAP and information indicating whether or not the additional control channel is present from a frame control header (FCH);
   decoding the additional control channel after identifying a start position of the additional control channel taking into consideration the size of the MAP if the additional control channel is present; and
   determining whether to decode a legacy control channel according to decoding information obtained from at least one of the FCH, the additional control channel and a broadcast channel, wherein the decoding information indicates whether or not an MS supporting the enhanced communication system needs to decode the legacy control channel.

8. The method of claim 7, wherein the step of decoding the additional control channel comprises selectively decoding the additional control channel placed after a position of the MAP after reading a type of the additional control channel from the FCH.

9. The method of claim 7, wherein the step of decoding the additional control channel comprises decoding the MAP by an MS if the MS does not support the enhanced communication system.

10. The method of claim 7, wherein the step of decoding the additional control channel comprises detecting a format of the additional control channel by performing blind detection.

11. A method for decoding an additional control channel generated for an enhanced communication system, the method comprising:
   reading information on a start position of the additional control channel from a preamble or a size of the additional control channel from a frame control header (FCH), wherein the additional control channel is placed prior to the preamble and the FCH;
   decoding the additional control channel in a backward direction in a time domain, starting from a position of the preamble, while a mobile station (MS) buffers downlink signals; and
   determining whether to decode a legacy control channel according to decoding information obtained from at least one of the FCH, the additional control channel and a broadcast channel, wherein the decoding information indicates whether or not an MS supporting the enhanced communication system needs to decode the legacy control channel.

12. A mobile station (MS) for a communication system that is enhanced by additionally generating a control channel in a legacy communication system, the MS comprising:

a processor configured to decode at least one control channel, wherein the processor is configured to read a size of a MAP and information indicating whether or not an additional control channel is present from a frame control header (FCH) of a downlink signal received from a base station and to decode the additional control channel after identifying a start position of the additional control channel taking into consideration the size of the MAP if the additional control channel is present, and wherein the processor is configured to determine whether to decode a legacy control channel according to decoding information obtained from at least one of the FCH, the additional control channel and a broadcast channel, wherein the decoding information indicates whether or not the MS supporting the enhanced communication system needs to decode the legacy control channel.

* * * * *